United States Patent [19]
El-Ibiary

[11] Patent Number: 6,147,619
[45] Date of Patent: Nov. 14, 2000

[54] INSTRUMENTED DEAD SHAFT FOR PULLEY ASSEMBLIES AND THE LIKE

[75] Inventor: Yehia M. El-Ibiary, Simpsonville, S.C.

[73] Assignee: Reliance Electric Technologies, LLC, Thousand Oaks, Calif.

[21] Appl. No.: 08/908,390

[22] Filed: Aug. 7, 1997

[51] Int. Cl.⁷ .................................................. G08B 21/00
[52] U.S. Cl. ......................................................... 340/686.3
[58] Field of Search ............................... 340/686.3, 679, 340/672, 669, 670, 682; 384/448, 446

[56] References Cited

U.S. PATENT DOCUMENTS

| | | | |
|---|---|---|---|
| 4,072,893 | 2/1978 | Huwyler | 324/208 |
| 4,376,298 | 3/1983 | Sokol et al. | 364/551 |
| 4,676,670 | 6/1987 | Nisley | 384/247 |
| 5,277,543 | 1/1994 | Noguchi et al. | 415/118 |
| 5,285,973 | 2/1994 | Goforth et al. | 241/36 |
| 5,439,296 | 8/1995 | El-Ibiary | 384/448 |
| 5,642,105 | 6/1997 | Duffy et al. | 340/870.17 |

OTHER PUBLICATIONS

Literature from Precision, "The Smart Idler", pp. 2–3, May 9, 1997.

*Primary Examiner*—Nina Tong
*Attorney, Agent, or Firm*—Patrick S. Yoder; John J. Horn; William R. Walbrun

[57] ABSTRACT

An instrumented dead shaft is provided for a rotating machine system, such as a drum pulley. The shaft includes bearing support regions for receiving bearings for supporting a rotating element. The shaft also includes at least one sensor assembly, and preferably a number of sensor assemblies for sensing operating parameter of the shaft system. In a preferred configuration, the system includes a rotational speed sensor, temperature sensors, load sensors, and an accelerometer. The speed sensor detects rotational speed of the rotating element and applies an output signal representative thereof to an interface circuit. The temperature sensors provide an indication of the bearing temperatures. The load sensors provide an indication of the strain of the shaft during loading. Output signals from all sensors are transmitted to a control and monitoring circuit via network interfaces. The data links between network interface circuitrys and the sensors are embedded in the shaft. The data links may thus pass beneath the bearing support regions, enabling the sensors to be placed freely along the shaft.

19 Claims, 3 Drawing Sheets

INSTRUMENTED DEAD SHAFT FOR PULLEY ASSEMBLIES AND THE LIKE

BACKGROUND OF THE INVENTION

1. Field of the Invention

The present invention relates generally to the field of mechanical power transmission via a pulley or other rotating mechanical element mounted on a stationary or dead shaft. More particularly, the invention relates to a dead shaft arrangement including instrumentation for monitoring a plurality of parameters relating to operation of the mechanical element. The invention also relates to an instrumented dead shaft configured to be incorporated into a control and monitoring system.

2. Description of the Related Art

An array of structures are known in the art of mechanical power transmission for supporting a machine element, such as a pulley, in rotation on a machine frame. Applications for such structures include belt drives and conveyors, as well as a wide range of other systems. In general, such structures typically either employ a rotating or "live" shaft, or a stationary or "dead" shaft. In live shaft structures, the machine element is mounted in a fixed position with respect to a shaft, and the shaft is supported for rotation on bearings secured to the machine frame. In dead shaft structures, the shaft is secured to the machine frame and the rotating machine element is supported by bearings on the shaft.

Advances in industrial automation have prompted the need to integrate mechanical power transmission structures of this type more completely with other components, including centralized and distributed control and monitoring systems. Modem industrial automation systems commonly allow for networking of large numbers of sensors and actuators linked to virtually all segments of a plant or installation. Such large scale integration greatly facilitates monitoring and coordination of plant processes, and permits plant personnel to plan for scheduled and unscheduled maintenance of the machine systems. For rotating machinery, parameters of particular interest might include running temperature, speeds, loads, stresses, lubrication conditions and so forth, Despite the increasing need for feedback information on the operating condition of mechanical transmission components, equipping such components with appropriate instrumentation to collect the information poses significant difficulties in many applications. For example, while certain instrumentation, such as magnetic or inductive proximity switches for indicating rotational speed, may be designed into certain applications, other sensors are more difficult to place due to the particular geometry of the equipment. This is particularly true of load and temperature sensors. Moreover, even where various sensors can be individually placed on separate machine elements, these must generally be wired separately to input devices for incorporation into a control and monitoring network, adding to the cost and complexity of instrumenting the machine.

There is a need, therefore, for a technique for instrumenting rotating machinery that offers a range of operating parameter information through a relatively straightforward interface. In particular, there is a need for an instrumented dead shaft for use with pulleys and other rotating machine elements that is capable of providing information relating to parameters such as rotational speed, bearing temperature, and load or stress. The shaft should ideally be available as a packaged unit with one or more of the instruments installed. The shaft should also be capable of integration with a networked monitoring and control system for remotely detecting the sensed parameters.

SUMMARY OF THE INVENTION

The invention provides a novel dead shaft structure designed to respond to these needs. The shaft may be used in a variety of applications, but is particularly well suited for use with pulleys supported by a pair of spaced apart bearings. A number of different sensors may be incorporated directly into the shaft, including a rotational speed indicator, bearing temperature sensors, load sensors and an accelerometer. Conductors carrying signals from the sensors may conveniently be channeled through the shaft beneath the support bearings. An electronic power supply may be incorporated into the unit for supplying power to the sensors, for conditioning the signals from them, and for communicating over a network in accordance with a predetermined communications protocol.

Thus, in accordance with a first aspect of the invention, a shaft is provided for supporting a machine element in rotation. The shaft is configured to be fixedly supported on a machine frame. The shaft includes at least one bearing support region for receiving an antifriction bearing. The antifriction bearing supports the machine element in rotation on the shaft. The shaft includes at least one sensor fixedly supported thereon. The sensor generates parameter signals representative of an operating parameter of the shaft. The sensor includes a communications link for transmitting the parameter signals to a remote location. The shaft also includes an internal channel. The communications link is at least partially disposed in the internal channel. In accordance with a particularly preferred embodiment of the invention, a plurality of sensors are disposed on the shaft and each sensor includes a respective communications link for transmitting parameter signals to a remote location.

In accordance with another aspect of the invention, a pulley support shaft is provided for supporting a pulley in rotation. The shaft is configured to be fixedly supported on a machine frame, and includes first and second bearing support regions. The bearing support regions receive respective first and second antifriction bearings. The bearings support the pulley in rotation on the shaft. The shaft includes first and second temperature sensors disposed adjacent to the first and second bearing support regions, respectively. The first and second temperature sensors generate temperature signals representative of temperatures of the first and second bearings. The first and second temperature sensors each include communications links for transmitting the temperature signals to a remote location. The shaft also includes a rotational speed sensor fixedly supported thereon. The speed sensor generates speed signals representative of the rotational speed of the pulley. The speed sensor includes a third communications link for transmitting the speed signals to a remote location.

In accordance with another aspect of the invention, a shaft system is provided for supporting a machine element in rotation. The shaft system includes a shaft configured to be fixedly supported on a machine frame. The shaft includes at least one bearing support region for receiving an antifriction bearing. The bearing supports the machine element for rotation on the shaft. The system also includes a plurality of sensors supported on the shaft. Each sensor is configured to detect an operating parameter of the shaft system and to generate a corresponding parameter signal representative thereof A plurality of communications links are coupled to the sensors for transmitting the parameter signals from the sensors. An interface circuit is coupled to the communications links and is configured to receive the parameter signals and to transmit output signals to a remote monitoring circuit.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
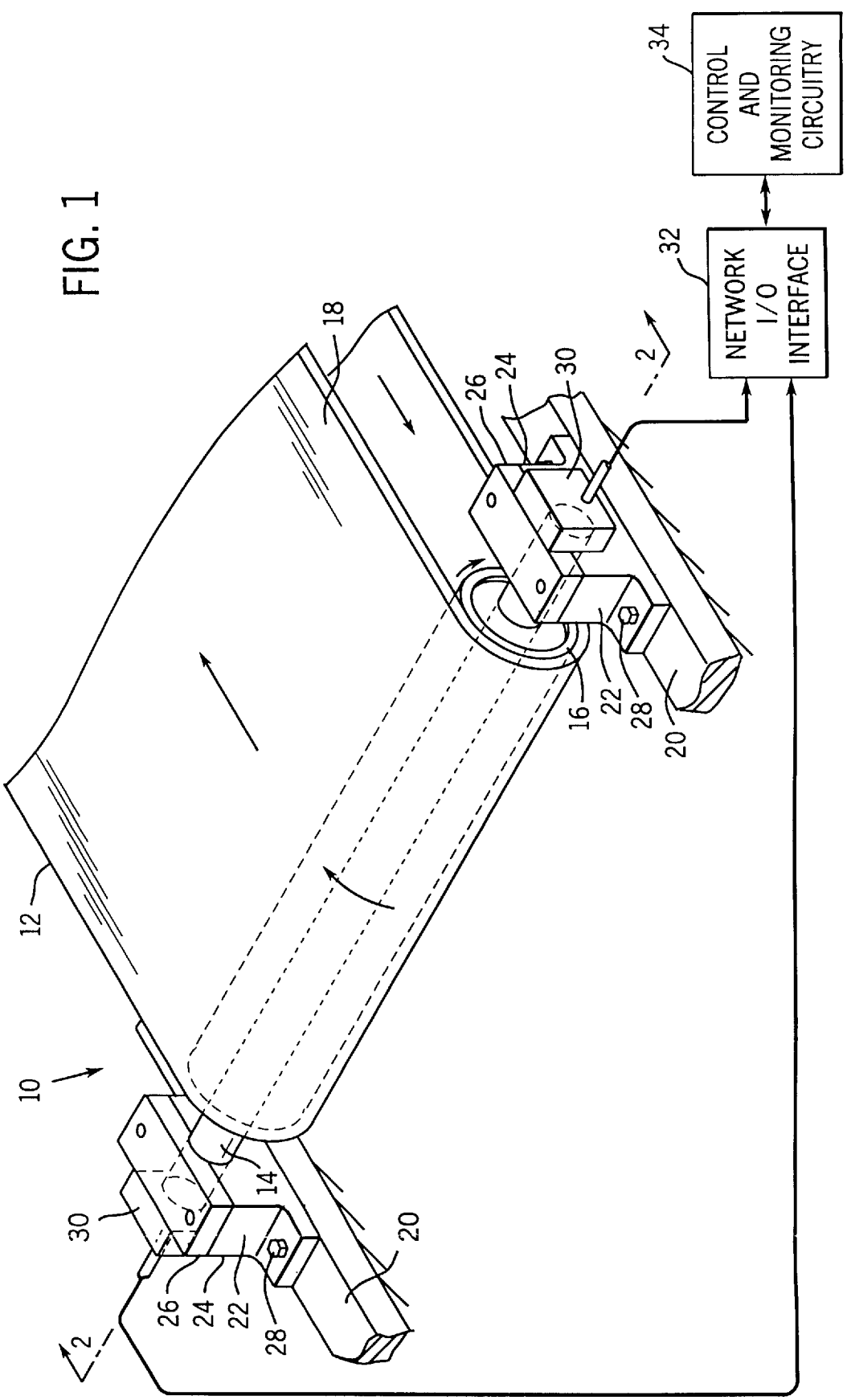
FIG. 1 is perspective view of a portion of a conveyor system including an instrumented shaft and communications links in accordance with the invention.

Turning now to the drawings and referring first to FIG. 1, an instrumented shaft system, designated generally by the reference numeral 10 is illustrated coupled to a conveyor 12. Shaft system 10 includes an instrumented shaft 14 supporting a machine element 16 in rotation. In the particular embodiment illustrated in the figures, machine element 16 is a rotary drum or pulley around which a conveyer belt 18 passes. Conveyors of the type illustrated in the figures are common in many industrial and mining applications. However, it should be noted that the novel characteristics of shaft system 10 set forth in the present discussion are not limited to any particular type of machine system or application.

Shaft 12 is fixedly supported on machine frame elements 20 by means of support blocks 22. Support blocks 22, which securely hold ends of shaft 14, each include a lower support 24, a cap 26 fixed to lower support 24, and bolts 28 or similar fasteners for securing support blocks 22 to machine frame elements 20. In the configuration illustrated in the figures, shaft 14 is mounted in blocks 22 by removing caps 26, placing shaft 14 in lower supports 24, and replacing caps 26 securely over shaft 14 (see FIGS. 2 and 3). As illustrated in FIG. 1, and as described more fully below, shaft system 10 includes one or more data collection circuits 30 for receiving parameter signals indicative of operation of shaft system 10. Data collection circuits 30 are linked to a network input/output interface circuit 32 which, in turn, communicates signals representative of the operating parameters to remote control and monitoring circuitry 34. Thus, as described in greater detail below, shaft system 10 permits remote monitoring of one or more operating parameters of shaft 14 by means of modular networking circuitry.

Figure 2:
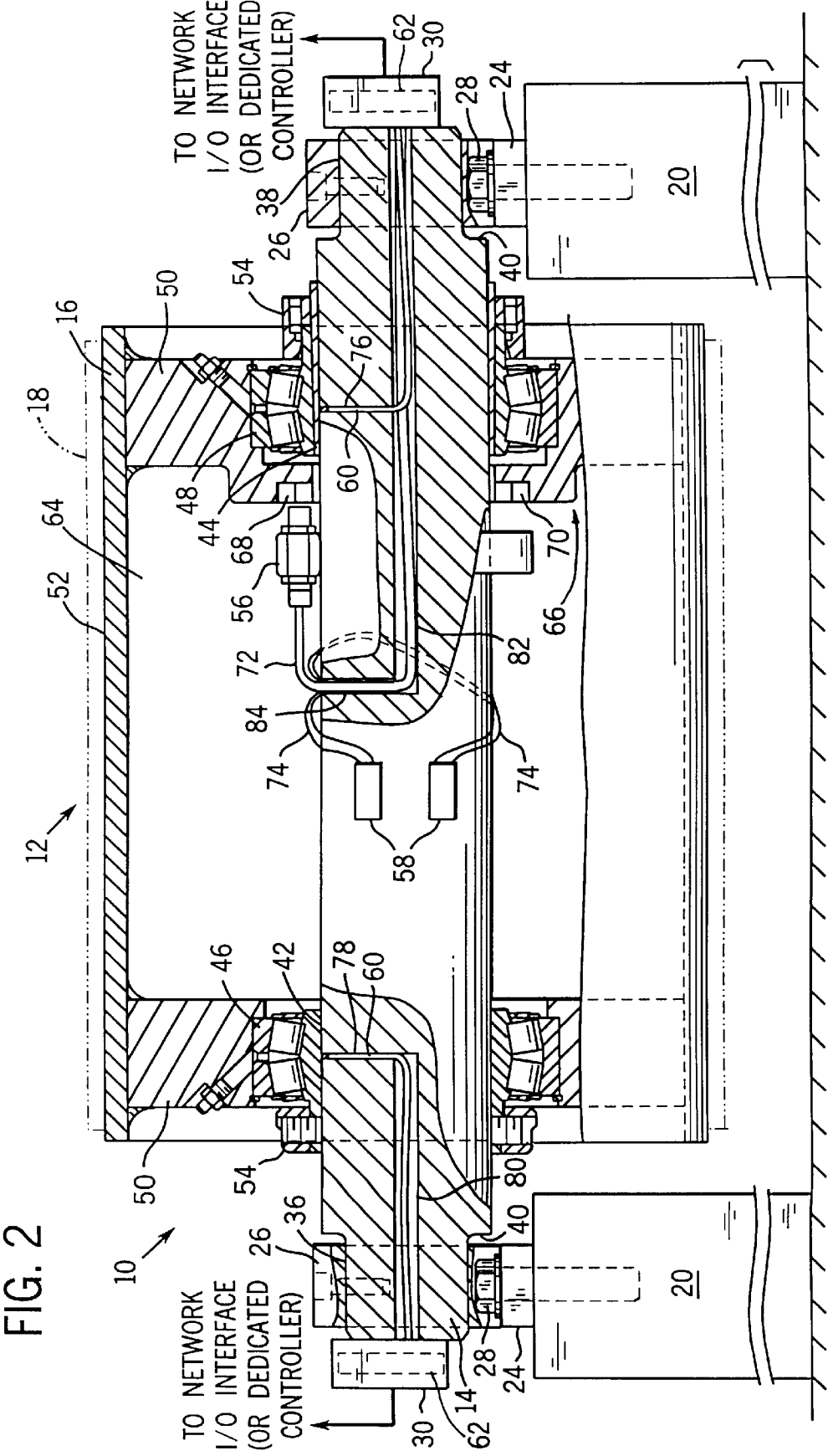
FIG. 2 is a partial cross-sectional view of the shaft system illustrated in FIG. 1 along line 2—2, showing a first preferred configuration of instrumentation associated with the shaft along with routing for communications links between the instrumentation and remote circuitry.

As best illustrated in FIG. 2, a shaft system 10 may include a number of separate sensing systems supported on and associated with shaft 14. Shaft 14 preferably includes at either end a support extension 36 and 38 designed to be received within and supported by support blocks 22. Shaft 14 may include abutment shoulders 40 adjacent to the support extensions for limiting lateral movement of shaft 14 once mounted on machine frame elements 20. Inboard from support extensions 36 and 38, shaft 14 includes a pair of bearing support regions 42 and 44. Bearing support regions 42 and 44 are configured to receive antifriction bearing sets 46 and 48 for supporting machine element 16 in rotation on shaft 14. Bearing sets 46 and 48 may be of any suitable type, including ball-bearings, roller-bearings, needle-bearings, and the like. In the embodiment illustrated in the figures, bearing sets 46 and 48 interface with end disks 50 of machine element 16 to support a central drum 52 axially disposed about shaft 14. As will be apparent to those skilled in the art, shaft system 10 may include appropriate hardware, such as collars 54, for aligning machine element 16 and bearing sets 46 and 48 in a proper location along shaft 14.

Shaft system 10 permits at least one, and preferably several operating parameters of shaft 14 to be detected and signals representative of the operating parameters to be conveyed and monitored from a remote location, such as an operator's station or automatic control system. Thus, as illustrated in the figures, shaft system 10 includes a rotational speed sensor 56, load sensors 58, temperature sensors 60, and accelerometers 62. In the preferred embodiment illustrated in the figures, wherein the machine element 16 forms a central cavity 64, some or all of the sensors may be advantageously positioned within cavity 64 to provide protection from surrounding machinery, debris, and the like.

In a presently preferred embodiment, speed sensor 56 is an inductive, magnetic proximity sensor or capacitive positioned adjacent to a timing portion 66 of one of the end disks 50 of machine element 16. Timing portion 66 is preferably formed directly on end disk 50 and includes a plurality of recesses 68 separated by raised metallic regions 70. As will be appreciated by those skilled in the art, as machine element 16 rotates on shaft 14, and recesses 68 and metallic regions 70 cyclically pass within close proximity to sensor 56, sensor 56 will generate pulsed signals at a rate proportional to the rotational speed of machine element 16. A communications or data link 72 is coupled to sensor 56 and transmits the pulsed rotational speed signals to a data collection circuit 30 as described below.

Figure 3:
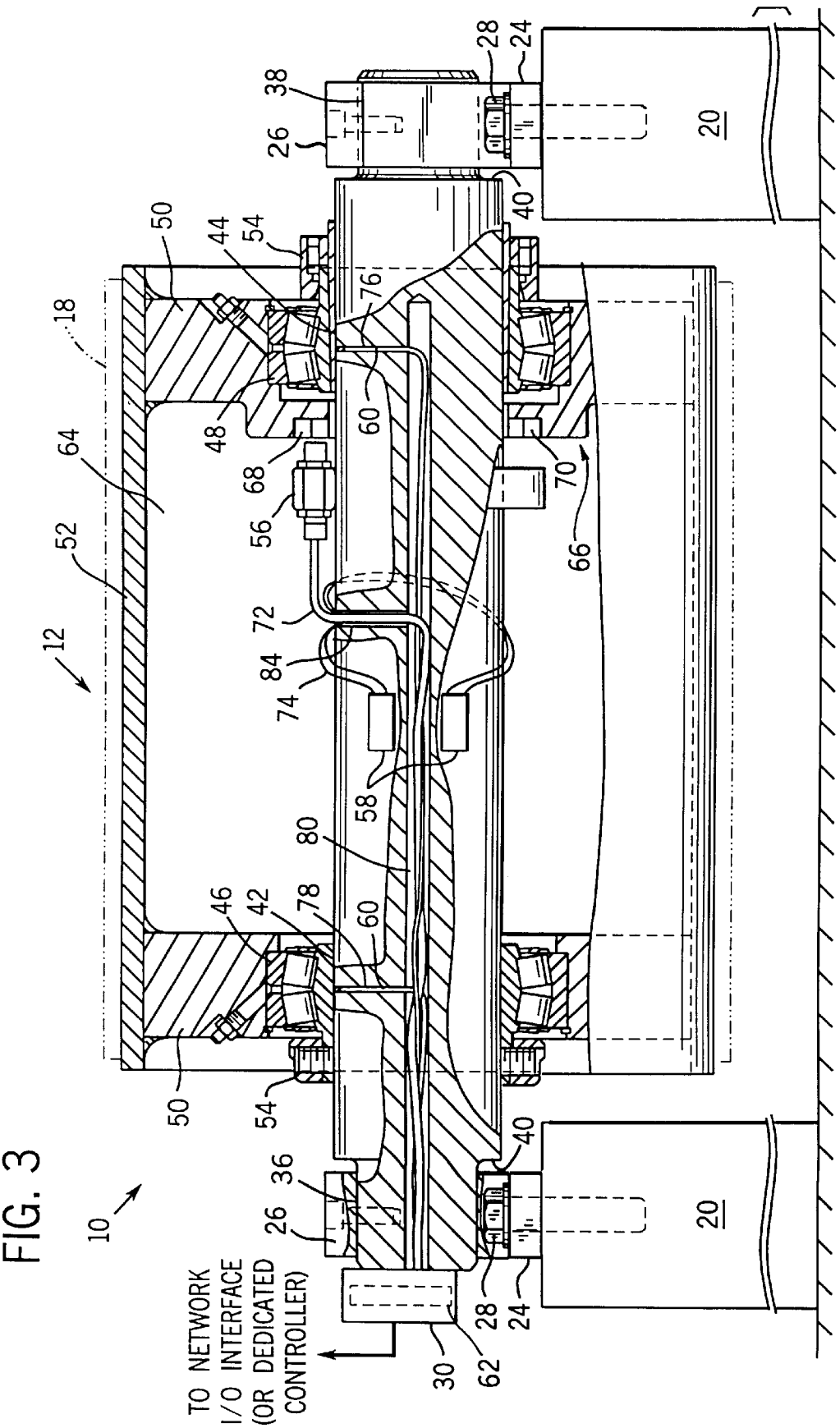
FIG. 3 is a cross-sectional view similar to FIG. 2, illustrating an alternative configuration of the shaft system wherein a communications links for the various sensors are routed through a single central channel.

Load sensor 58 are fixed to the outer surface of shaft 14 as illustrated in FIGS. 2 and 3. Load sensors 58 may advantageously include foil or similar strain gauges which are solidly anchored to shaft 14 by means of an epoxy compound. Moreover, sensors 58 are preferably angularly displaced from one another to provide an indication of strain of shaft 14 as machine element 16 is loaded during operation. As will be appreciated by those skilled in the art, output signals from load sensors 58 will vary depending upon distortion or deformations of shaft 14 due to such loading. Each load sensor 58 is provided with data links 74 for communicating the load signals thus generated to a data collection circuit 30.

Temperature sensors 60 are disposed adjacent to bearing support regions 42 and 44, and generate temperature signals representative of temperatures of bearings sets 46 and 48. In the presently preferred embodiment, temperature sensors 60 include thermocouples which generate output signals proportional to temperature. Each temperature sensor 60 is disposed in a recess 76 drilled beneath bearing support regions 42 and 44. Temperature sensors 60 are then secured in shaft 14 by means of an epoxy resin or the like. Alternatively, temperature sensor 60 may be oriented at various angles within shaft 14 or may be disposed generally parallel to the centerline of shaft 14 just below bearing regions 42 and 44. Each temperature sensor 60 is provided with a data link for transmitting temperature signals to data collection circuits 30. Once installed, temperature sensors 60 are preferably calibrated to provide a reliable indication of temperatures of bearing sets 46 and 48 despite temperature gradients between the bearing sets and the physical location of sensors 60 within shaft 14.

An accelerometer 62 is preferably disposed at one or both ends of shaft 14. Accelerometer 62 may be of any suitable type, such as a piezo-ceramic device available commercially from Reliance Electric Industrial Company, Dodge Division under the commercial designation "EZ Link". Such accelerometers produce an output signal representative of movements or vibrations of shaft system 10 during rotation of machine element 16. Vibration signals from accelerometer 62 are conveyed via data links (not shown) to data collection circuits 30.

As shown in FIG. 2, shaft 14 preferably includes a pair of internal channels 80 and 82 extending from support extensions 36 and 38, respectively, to appropriate locations along shaft 14. Moreover, a transverse channel 84 preferably communicates with at least one of the internal channels 82 to provide a routing path between an end of shaft 14 and intermediate location along the shaft. Channels 80, 82, and 84 provide paths through which data links 72, 74, and 78 may be routed. Thus, as illustrated in FIG. 2, data links 72 and 74 enter into transverse channel 84, and pass through transverse channel 84 and internal channel 82 to join data collection circuit 30 supported at the end of shaft 14. Similarly, data link 78, from temperature sensor 60 positioned below bearing set 46, is routed through internal channel 80 to data collection circuit 30 on the corresponding end of shaft 14. Once the data links are installed within these channels, they are preferably anchored and secured within the channels by an epoxy resin to provide a robust structure resistant to vibrations and debris when placed in service. Thus, instrumentation may be provided at various points along shaft 14 regardless of the location of bearing support regions 42 and 44.

As illustrated in FIG. 3, shaft 14 may be provided with a single longitudinal internal channel 80 in communication with one or more transverse channels 84. This configuration is particularly useful where the length of shaft 14 and routing of data links 72, 74, and 78 permit an extended internal channel to be formed, such as by drilling.

Data collection circuits 30 receive output signals from sensors 56, 58, 60, and 62, and condition these signals for further transmission in accordance with a predetermined network protocol. In a particularly preferred embodiment, data collection circuits 30 include a DeviceNet interface, commercially available from the Allen-Bradley Company of Milwaukee, Wis. To permit shaft system 10 to be interfaced with a large scale industrial control or monitoring network, data collection circuits 30 are preferably linked to a network input/output interface circuit 32. Interface circuit 32 preferably includes circuitry for transmitting output signals representative of the parameter signals collected by the sensors in accordance with various network communications structures, such as cyclic poling, token ring networks, and so forth. A preferred network input/output interface circuit 32 includes a DeviceNet scanner, commercial available from the Allen-Bradley Company of Milwaukee, Wis. Moreover, signals received and conditioned by interface circuit 32 are transmitted to control and monitoring circuitry 34 via appropriate data links. In a preferred embodiment, control and monitoring circuitry 34 includes an appropriately programmed programmable logic controller or personal computer, such as operating on an Intel Pentium platform of the like. Thus, control and monitoring circuitry 34 can remotely receive and monitor signals from sensors 56, 58, 60, and 62 indicative of operating parameters of shaft system 10.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A shaft for supporting a machine element in rotation, the shaft being configured to be fixedly and non-rotationally supported on a machine frame and including at least one bearing support region for receiving an antifriction bearing, the antifriction bearing supporting the machine element in rotation on the shaft, the shaft comprising:

at least one sensor fixedly supported with respect to the shaft, the sensor generating parameter signals representative of an operating parameter of the shaft, the sensor including a communications link for transmitting the parameter signals to a remote location; and wherein said at least one sensor comprises a rotational speed sensor fixedly supported on the shaft, the speed sensor generating speed signals representative of the rotational speed of the machine element and transmitting the speed signals to the remote location via the communication link;

an internal channel formed in and extending along the shaft, the communications link being at least partially disposed within the internal channel;

a network interface circuit coupled to the communication link, the network interface circuit being configured to receive the parameter signals and to apply the parameter signals to a monitoring circuit.

2. The shaft of claim 1, wherein said network interface circuit is supported adjacent to the shaft.

3. The shaft of claim 1, further comprising a temperature sensor fixedly supported adjacent to the bearing, the temperature sensor generating a temperature signal representative of the temperature of the bearing, the temperature sensor including a second communications link for transmitting the temperature signal to the remote location.

4. The shaft of claim 3, wherein the second communications link is at least partially disposed within the internal channel.

5. The shaft of claim 3, wherein the shaft further comprises a second internal channel, and wherein the second communications link is at least partially disposed within the second internal channel.

6. The shaft of claim 3, further comprising the network interface circuit coupled to the first and second communications links, the network interface circuit being configured to receive the parameter and temperature signals and to apply the parameter and temperature signals to the monitoring circuit.

7. The shaft of claim 1, wherein the shaft includes first and second bearing support regions for receiving first and second antifriction bearings, respectively, and wherein the shaft comprises first and second temperature sensors disposed within respective first and second recesses in the shaft adjacent to the first and second bearing support regions, the first and second temperature sensors generating temperature signals representative of the temperature of the first and second bearings, respectively.

8. A non-rotatable support shaft for supporting a rotating member in rotation, the shaft being configured to be fixedly supported on a machine frame and including first and second bearing support regions for receiving respective first and second antifriction bearings, the antifriction bearings supporting the rotating member in rotation on the shaft, the shaft comprising:

first and second temperature sensors disposed within the shaft adjacent to the first and second bearing support regions, respectively, the first and second temperature sensors generating temperature signals representative of temperatures of the first and second bearings, respectively, the first and second temperature sensors including first and second communications links for transmitting the temperature signals to a remote location; and a rotational speed sensor fixedly supported thereon, the speed sensor generating speed signals representative of the rotational speed of the rotating member, the speed sensor including a third communications link for transmitting the speed signals to a remote location;

at least one internal channel formed in and extending along the shaft, and wherein the first, second and third communication links are at least partially disposed within the at least one internal channel;

a network interface circuit coupled to the communication link, the network interface circuit being configured to receive the parameter signals and to apply the parameter signals to a monitoring circuit.

9. The shaft of claim 8, wherein said network interface circuit is supported adjacent to the shaft.

10. The shaft of claim 8, wherein the first and second temperature sensors are disposed within first and second internal recesses in the shaft, the first and second recesses at least partially underlying the first and second bearing support regions, respectively.

11. The shaft of claim 8, wherein the at least one internal channel includes first and second internal channels, the internal channels extending from predetermined locations along the shaft to end regions thereof, the first internal channel at least partially underlying the first bearing support region and the second internal channel at least partially underlying the second bearing support region.

12. The shaft of claim 8, wherein the rotating member includes a first end disc configured to be supported on the first bearing and a second end disc configured to be supported on the second bearing, the first end disc carrying at least one metallic extension, and wherein the rotational speed sensor is supported on the shaft in a predetermined location proximate to the first end disc and generates the speed signal by detecting passage of the at least one metallic extension past the predetermined location.

13. The shaft of claim 8, further comprising a load sensor fixedly disposed on the shaft, the load sensor generating a load signal representative of load applied to the shaft, the load sensor including a fourth communications link for transmitting the load signal to the remote location.

14. The shaft of claim 13, wherein the load sensor is disposed intermediate the first and second bearing support regions.

15. A shaft system for supporting a machine element in rotation, the shaft system comprising:

a shaft configured to be fixedly and non-rotationally supported on a machine frame and including at least one bearing support region for receiving an antifriction bearing for supporting the machine element in rotation on the shaft;

a plurality of sensors supported on the shaft, each sensor being configured to detect an operating parameter of the shaft system and to generate a corresponding parameter signal representative thereof;

a plurality of communications links, a communications link being coupled to each of the plurality of sensors for transmitting the parameter signals therefrom; and at least one internal channel formed in and extending along the shaft, and wherein at least one of the communication links is at least partially disposed within the at least one internal channel;

an network interface circuit coupled to the communications links, the interface circuit being configured to receive the parameter signals and to transmit output signals to a remote monitoring circuit.

16. The system of claim 15, wherein the plurality of sensors includes at least a rotational speed sensor.

17. The system of claim 16, wherein the plurality of sensors further includes at least one load sensor.

18. The system of claim 15, further comprising a power supply circuit, the power supply circuit being coupled to at least one of the sensors for supplying power thereto.

19. The shaft of claim 15, wherein said network interface circuit is supported adjacent to the shaft.

* * * * *